United States Patent [19]

Witenhafer

[11] 4,068,059

[45] Jan. 10, 1978

[54] INTERNALLY COATED REACTION VESSEL FOR USE IN OLEFINIC POLYMERIZATION

[75] Inventor: Donald Edward Witenhafer, North Olmstead, Ohio

[73] Assignee: The B. F. Goodrich Company, Akron, Ohio

[21] Appl. No.: 769,499

[22] Filed: Feb. 17, 1977

[51] Int. Cl.$^2$ .......................... C08F 2/18; C08F 2/20; C08F 14/06
[52] U.S. Cl. ...................................... 526/62; 526/344
[58] Field of Search ........................................ 526/62

[56] References Cited

U.S. PATENT DOCUMENTS

| | | | |
|---|---|---|---|
| 3,669,946 | 6/1972 | Koyanagi et al. | 526/62 |
| 3,959,235 | 5/1976 | Nishigaki et al. | 526/62 |
| 4,024,301 | 5/1977 | Witenhafer et al. | 526/62 |
| 4,024,330 | 5/1977 | Morningstar et al. | 526/62 |

*Primary Examiner*—Alan Holler
*Attorney, Agent, or Firm*—Roy P. Wymbs

[57] ABSTRACT

This invention relates to a polymerization reaction vessel having a coating on the inner surfaces thereof resulting from applying thereto a coating composition containing, as a primary ingredient, an alkali soluble dye dissolved in an aqueous alkali metal hydroxide solution or an ammonium hydroxide solution. When polymerizing olefinic monomers, such as vinyl halides, vinylidene halides, and vinylidene monomers having at least one terminal $CH_2=C<$ grouping, and mixtures thereof, in the presence of said coating, polymer build-up on the inner surfaces of the reaction vessel is substantially eliminated. Further, multiple charges or batches of polymer can be made in said internally coated reaction vessel without opening the same between charges thus preventing the escape of unreacted monomer to the atmosphere.

12 Claims, No Drawings

INTERNALLY COATED REACTION VESSEL FOR USE IN OLEFINIC POLYMERIZATION

CROSS REFERENCE TO RELATED APPLICATIONS

Related applications for U.S. patent are Ser. No. 574,037, filed May 2, 1975, now U.S. Pat. No. 4,024,301, in the names of Donald E. Witenhafer, James B. Haehn and Louis Cohen and Ser. No. 714,317, filed Aug. 16, 1976, in the name of Louis Cohen.

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "build-up", of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are often unstable and during the polymerization reaction, vinyl chloride polymer builds up on the interior surfaces of the polymerization reactor, including the surfaces of the baffles and agitator. Obviously, this polymer buildup must be removed since it results in further formation of polymer build-up which in turn results in a crust that adversely affects heat transfer and contaminates the polymer being produced.

The nature of the polymer build-up, or insoluble deposit on the walls of the reactor, is such that in the commercial production of polymers, as described above, it has in the past been standard practice, after each polymerization reaction is completed, to have an operator enter the reactor and scrape the polymer build-up off the walls and off the baffles and agitator. An operation such as this is not only costly, both in labor and down-time of the reactor, but presents potential health hazards as well. While various methods have heretofore been proposed to reduce the amount and nature of polymer build-up on polymerization reactor surfaces, such as solvent cleaning, various hydraulic and mechanical reactor cleaners, and the like none has proved to be the ultimate in polymer build-up removal. That is to say, these various methods and apparatus have done an acceptable job, but there is still room for improvement in this area, particularly from an economic point of view.

Various methods of coating the inner walls of polymerization reactors have heretofore been proposed to reduce polymer build-up thereon. For example, in U.S. Pat. No. 3,669,946, issued June 13, 1972, Koyanagi et al., there is taught the use of polar organic compounds, including dyes, as coating materials to prevent build-up on polymerization reactor walls. However, the coating is applied to the reactor surfaces from an organic solvent solution thereof. The use of an organic solvent presents difficulties, such as recovery of the organic solvent, contamination of the surrounding atmosphere and most importantly, drying of the surfaces, particularly in large reactors. Therefore, experience has shown that it would be more practical and economical to find a coating that could be applied to said surfaces from an aqueous solution and not have to be dried thereafter.

SUMMARY OF THE INVENTION

It has been found that if a reactor vessel has been previously coated on the interior surfaces with the proper coating, undesirable polymer build-up on said surfaces can be substantially decreased, and in some cases entirely eliminated, when polymerizing olefinic monomers therein. I have found that when the interior surfaces of a reactor are coated with a coating composition comprising an alkali soluble dye dissolved in an aqueous alkali metal or ammonium hydroxide solution, polymer build-up on said surfaces of the reactor is essentially eliminated. Due to the nature of the coating composition, it can be applied to the inner surfaces of the reactor without opening the same thus providing a closed polymerization system. In polymerizing the olefinic monomers, the same is done in an aqueous polymerization medium which is kept in constant contact with said coated surfaces throughout the polymerization reaction.

DETAILED DESCRIPTION

In accordance with the present invention, a film or coating of an alkali soluble dye is applied to the interior surfaces of a polymerization reactor or vessel by merely contacting said surfaces with an aqueous alkali metal hydroxide solution or an ammonium hydroxide solution of said dye. Likewise, all exposed surfaces in the interior of the reactor, other than the walls, such as the baffles, agitator, and the like, are also treated in like manner. After the aqueous alkali metal or ammonium hydroxide solution of the dye has been applied to said surfaces, the polymerization medium can be introduced to the reactor and the reaction started without the necessity of drying the surfaces prior to said introduction of the polymerization medium. However, it is preferred, and the best results are obtained, when after the application of the dye to the interior surfaces of the reactor, the surfaces are sprayed with water or the reactor is filled with water and drained, thereby, surprisingly, leaving on said surfaces a tightly adhering coating or film of the dye, which is not affected by the polymerization medium, in the sense of preventing it from achieving its assigned function, namely, the prevention of polymer build-up on said surfaces.

Among the dyes suitable in the practice of the present invention are those which contain in their chemical structure one or more of the following radicals: —OH, —COOH, —SO$_3$H, and —SO$_3$Na, which radicals may be the same or different on any one dye structure. These groups or radicals are usually attached to an aromatic nucleus. While other groups or radicals are present in most of the dyes, the above-named radicals are necessary for alkali solubility, that is, in an aqueous alkali metal hydroxide solution or in an aqueous ammonium hydroxide solution. The classes of dyes which one or more of said radicals are the azo dyes, such as monoazo and polyazo dyes; metal-containing azo dyes; mordant dyes; pyrazolones; stilbene dyes; azoic dyes; phenols; naphthols; anthraquinone dyes; diphenylmethane and triphenylmethane dyes; thiazoles; nitro dyes; nitroso dyes; xanthenes; benzoquinones and naphthoquinones; and solubilized vat dyes, such as indigoids and anthraquinoids. In addition to these dyes, the ionic dyes are also useful in the practice of the present invention. By ionic dyes is meant the acridines, azines, oxazines and the thiazines. The ionic dyes exist as salts in the dry state and all have a heterocyclic ring system in their structure which is positively charged. As specific examples of the above-named dyes having one or more of the indicated radicals in their chemical structure, there may be named 4-(p-nitrophenylazo)Resorcinol, Alizarin, Alizarin Yellow R, Alizarin Red S, Orange G, Phenolphthalein, Naphthol Yellow S, Congo Red, Eriochrome Black T, Tartrazine, Chrome Violet, Auramine O, Malachite Green, Naphthazarin, Alizarin Irisol R, and Indigosol O. As specific examples of the ionic dyes, there may be named Celestine Blue, Acridine Orange NO, Saframine T, Meldola's Blue, and Methylene Blue.

The dye coating solution is made by conventional methods, using heat and agitation where necessary. The dye is dissolved in the appropriate aqueous alkali metal hydroxide solution or ammonium hydroxide solution to an extent such that the solids content of the coating solution does not prevent it being sprayed on the inner surfaces of the reactor through spray nozzles mounted permanently thereon. Usually a coating solution having a solids content of alkali soluble dye in the range of about 0.1% to about 20.0% by weight is satisfactory. However, the solids content depends upon the molecular weight of the alkali soluble dye. That is, the solids content could, in certain instances, be greater than 20.0% or less than 0.1% by weight. In addition, additives may be employed in the coating solution, if desired, such as plasticizers, stabilizers, lubricants, or fillers, and the like. Of course, when additives are employed, suitable adjustment in the solids content of the coating solution is made.

The aqueous alkali metal hydroxide solutions used in making the coating solutions of the instant invention are those made from a metal in Group 1A of the periodic system. For example, such hydroxides as sodium hydroxide, lithium hydroxide, potassium hydroxide, rubidium hydroxide, cesium hydroxide, and francium hydroxide. Aqueous solutions of other compounds may also be used. For example, aqueous solutions of quaternary amines, such as the tetraalkyl ammonium hydroxides, and the like, or other alkali metal salts, such as phosphates, for example, trisodium phosphate, and the like. We have found that the important point is that the compound chosen must, in aqueous solution, have a sufficiently high basicity or pH, usually about 8.0 or higher. However, it is believed that some compounds having a pH lower than 8.0 would be operable in the present invention.

The temperature of the aqueous alkali metal or ammonium hydroxide solution when the dye is dissolved therein is not critical. Usually a temperature in the range of about 0° C. to about 100° C. is satisfactory. Agitation during dissolution of the dye is desirable. In order to obtain the desired results, the concentration of the alkali metal or ammonium hydroxide in the aqueous solution may be varied between about 0.01% by weight to about 20.0% by weight. The preferred concentration is from 0.1% to 5.0% by weight.

As previously pointed out, the coating solution is usually applied to the inner reactor surfaces by spraying. However, it is also possible to apply the coating solution by flooding the reactor and then draining, or by painting on the reactor surfaces, but spraying is the most practical and economical method of application. After spraying the coating solution on the inner surfaces and draining the reactor, the polymerization reaction can be started immediately without further treatment of said surfaces. However, it has been found that best results are obtained when after applying the coating solution to the surfaces of the reactor, the surfaces are sprayed with water and the reactor drained prior to charging the reactor with the polymerization mix. The present coating works well on glass or metal surfaces, such as stainless steel, and the like.

The spraying of the coating solution on the inner surfaces of the reactor with water is believed to have a nonsolvent effect causing the dye to precipitate and adhere to the reactor surfaces. While the exact adhesion mechanism of the coating to the surface is not known for certain, it is believed to involve some type of electrical force or adsorption between the reactor surfaces and the dye. At any rate, the coating composition of the present invention does substantially eliminate polymer build-up on the reactor surfaces and what little polymer build-up, if any, that may occur, is of the "sandy" type which is of such a nature that it is readily removable from the reactor surfaces. The polymer build-up to be avoided is what is referred to as "paper build-up" since this type of build-up is very difficult to remove and usually requires hand scraping or a high pressure jet stream of water or other liquid. In either event, the reactor must be opened in order to clean the same which, of course, allows the escape into the atmosphere of unreacted vinyl chloride.

In accordance with this invention, several polymerizations may be run in a coated reactor before having to recoat the surfaces thereof. However, I have found it expeditious, and it is preferred, to coat the internal surfaces of the reactor after each polymerization run therein. As previously pointed out, with the spray nozzles permanently mounted at strategic points on the reactor, it is possible to reach all inner surfaces thereof without opening the reactor. After each polymerization is complete and the reactor is drained, the inner surfaces are sprayed with water and the reactor flushed. Then the coating solution is sprayed on the surfaces and the reactor is drained of the excess solution in such a way that the solution can be sent to a recovery system, if desired. Then the surfaces are sprayed with water and the effluent is discarded, or recovered, if desired. This has the distinct advantage of substantially eliminating the escape of unreacted monomer vapors to the surrounding atmosphere, which under present day Governmental regulations must be kept to a minimum. Thereafter, the reactor is charged with the polymerization medium and ingredients in the usual manner and the polymerization reaction commenced. This cycle of operation is repeated after each polymerization run without opening the reactor.

After each application of the coating composition on the interior surfaces of the reaction vessel and spraying thereof with water, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated hereinafter with regard to the suspension polymerization of vinyl chloride, it is to be understood that the apparatus and process may likewise be applied in the dispersion, emulsion, or suspension polymerization of any polymerizable ethylenically unsaturated monomer or monomers where undesirable polymer build-up occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers having at least one terminal $CH_2=C<$ grouping, copolymerizable therewith in amounts as great as about 80% or more by weight of comonomer, based on the weight of the monomer mixture, since polymer build-up in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will normally vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

In order to rate the various coatings, a rating scale was devised with respect to paper and sandy build-up, as referred to above. After one charge, or polymerization, an uncoated reactor, the inner surfaces of which are uncleaned or solvent cleaned, will have both types of build-up and is given a rating of 1.5. Any rating below 1.0 is good or a definite improvement. In other words, 0.0 rating is perfect, and so on. However, I have found that more uniform results can be obtained, especially when more than one charge is made, if the inner surfaces of the reactor are first cleaned with an abrasive cleanser, such as Ajax, and the like, and thereafter a plurality of charges are run without cleaning between charges. With a precleaned reactor, the rating on an uncoated reactor after three charges is 1.3. This is used as the control in the Example hereinafter.

In order to more clearly define the present invention, the following specific examples are given. It is to be understood, however, that this is merely intended in an illustrative and not in a limitative sense. In the examples, all parts and percents are by weight unless otherwise indicated.

EXAMPLE I

In this Example, a number of different coating solutions were made up using the various dyes set out in Table I below. Each dye was dissolved in 0.5 normal NaOH to give a 1.5% by weight coating solution. Each dye was dissolved at room temperature with stirring. The internal surfaces of the reactor were Ajax cleaned and coated with the solution to be tested and then rinsed with water. In each run the following recipe was then charged to the reactor in usual fashion:

| | |
|---|---|
| Vinyl Chloride | 1000 gms. |
| Water (demineralized) | 2055 gms. |
| Vinol 540[1] | 0.5 gram |
| SBP[2] (catalyst) | 0.5 cc. |

[1] 89% hydrolyzed polyvinyl acetate
[2] di-secondary butyl peroxydicarbonate

A full reactor was used in the polymerizations, sufficient water being added to keep the reactor full. The temperature was maintained at 57° C. and the reaction medium was agitated. The water was added during the reaction as the mixture shrank because of formation of polymer. Upon the addition of 400 grams of water, the reaction was discontinued. The contents of the reactor were then removed in usual fashion. After removal of the polymer charge from the reactor, the internal surfaces were rinsed with water, then recoated, and rinsed with water and a second charge made and polymerized. After the second charge was polymerized, a third charge was polymerized using the same procedure as outlined above. Upon completion of the third charge, the internal surfaces of the reactor were classified in accordance with the aforementioned procedure for rating said surfaces. The results are tabulated in the following Table:

TABLE I

| | Dye | Build-up Paper | Rating Sandy |
|---|---|---|---|
| 1. | Control (no coating) | 1.3 | 1.3 |
| 2. | Orange G | 0.5 | 0.2 |
| 3. | Celestine Blue | 0.0 | 0.01 |
| 4. | Phenolphthalein | 0.5 | 1.0 |
| 5. | Alizarin Red S | 0.03 | 1.0 |
| 6. | Alizarin Yellow R | 0.0 | 0.2 |
| 7. | Alizarin | 0.0 | 0.01 |
| 8. | 4-(p-nitrophenylazo) Resorcinol | 0.0 | 0.1 |

The results above clearly indicate that the dye coated reactor was far superior to the control, or uncoated reactor.

Coating of the internal surfaces of the polymerization reactor, in accordance with the present invention, substantially reduces, and in many cases, practically eliminates polymer build-up on said surfaces during the polymerization reaction and thus results in increased production over a unit period of time. In those instances where a little polymer build-up does accumulate on the interior surfaces, it is not of the hard, rough, difficult-to-remove type and is easily removed without employing the difficult tedious scraping methods that are presently necessary in the art. More importantly, the present invention enables one to operate a closed polymerization system, which in the case of vinyl chloride polymerization, it has the advantage of reducing the parts per million of vinyl chloride in the atmosphere of the plant drastically and to a point that meets the new Governmental Regulations. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for substantially eliminating the build-up of polymers on the internal surfaces of polymerization reaction vessel which comprises applying to said surfaces a coating solution comprised of a dye dissolved in an aqueous alkali metal hydroxide or ammonium hydroxide solution, said dye being selected from the group consisting of acridines, azines, oxazines, thiazines, and alkali soluble dyes having in their chemical structure one or more radicals selected from the group consisting of —OH, —COOH, —SO$_3$H, and —SO$_3$Na, and wherein said radicals may be the same or different on any one dye structure.

2. A process as defined in claim 1 wherein the alkali metal hydroxide is sodium hydroxide.

3. A process as defined in claim 1 wherein the alkali metal hydroxide is potassium hydroxide.

4. A process as defined in claim 1 wherein the alkali metal hydroxide is lithium hydroxide.

5. A process as defined in claim 1 wherein the coating solution contains from about 0.1% to about 20.0% by weight of the dye.

6. A process as defined in claim 1 wherein the coating solution contains 1.5% by weight of the dye.

7. A process as defined in claim 6 wherein the aqueous alkali metal hydroxide is 0.5 normal sodium hydroxide.

8. A process as defined in claim 1 wherein the dye is dissolved in aqueous ammonium hydroxide.

9. A process as defined in claim 7 wherein the dye is 4-(p-nitrophenylazo)resorcinol.

10. A process as defined in claim 7 wherein the dye is Celestine Blue.

11. A process as defined in claim 7 wherein the dye is Orange G.

12. A process as defined in claim 7 wherein the dye is Alizarin Red S.

* * * * *